(12) United States Patent
Li et al.

(10) Patent No.: US 7,441,252 B2
(45) Date of Patent: Oct. 21, 2008

(54) CACHE CONTROL DEVICE, AND METHOD AND COMPUTER PROGRAM FOR THE SAME

(75) Inventors: Hong Bo Li, Kawasaki (JP); Yosuke Doi, Tokyo (JP)

(73) Assignee: SAP AG, Walldorf (DE)

( * ) Notice: Subject to any disclaimer, the term of this patent is extended or adjusted under 35 U.S.C. 154(b) by 378 days.

(21) Appl. No.: 11/021,479

(22) Filed: Dec. 23, 2004

(65) Prior Publication Data

US 2005/0188380 A1      Aug. 25, 2005

(30) Foreign Application Priority Data

Dec. 25, 2003    (JP)    ............................. 2003-431473

(51) Int. Cl.
*G06F 13/00* (2006.01)

(52) U.S. Cl. .................. 719/331; 719/316; 719/332; 718/1

(58) Field of Classification Search .................. 719/316, 719/331, 332; 718/1
See application file for complete search history.

(56) References Cited

U.S. PATENT DOCUMENTS

| 7,054,853 | B2 * | 5/2006 | Johnson et al. | ................. 707/2 |
| 7,127,724 | B2 * | 10/2006 | Lewallen | ..................... 719/332 |
| 2004/0187098 | A1 * | 9/2004 | Garg et al. | .................. 717/127 |

* cited by examiner

*Primary Examiner*—Andy Ho
(74) *Attorney, Agent, or Firm*—Fish & Richardson P.C.

(57) ABSTRACT

The cache control unit 15 of the mobile terminal 10 receives an access request for an instance of an object that specifies data to which applications 13 refers, and in the case that an instance of the object does not exist, creates an instance of the object and a counter. In addition, an instance of a reference setting class is created, the reference that refers to the instance of the requested object is set and the result is returned to the application 13, and the counter is incremented by 1. In the case that a release notification for the instance of the reference setting class is received, the counter is decremented by 1, and when the counter has reached 0, the instance of the object is released.

11 Claims, 12 Drawing Sheets

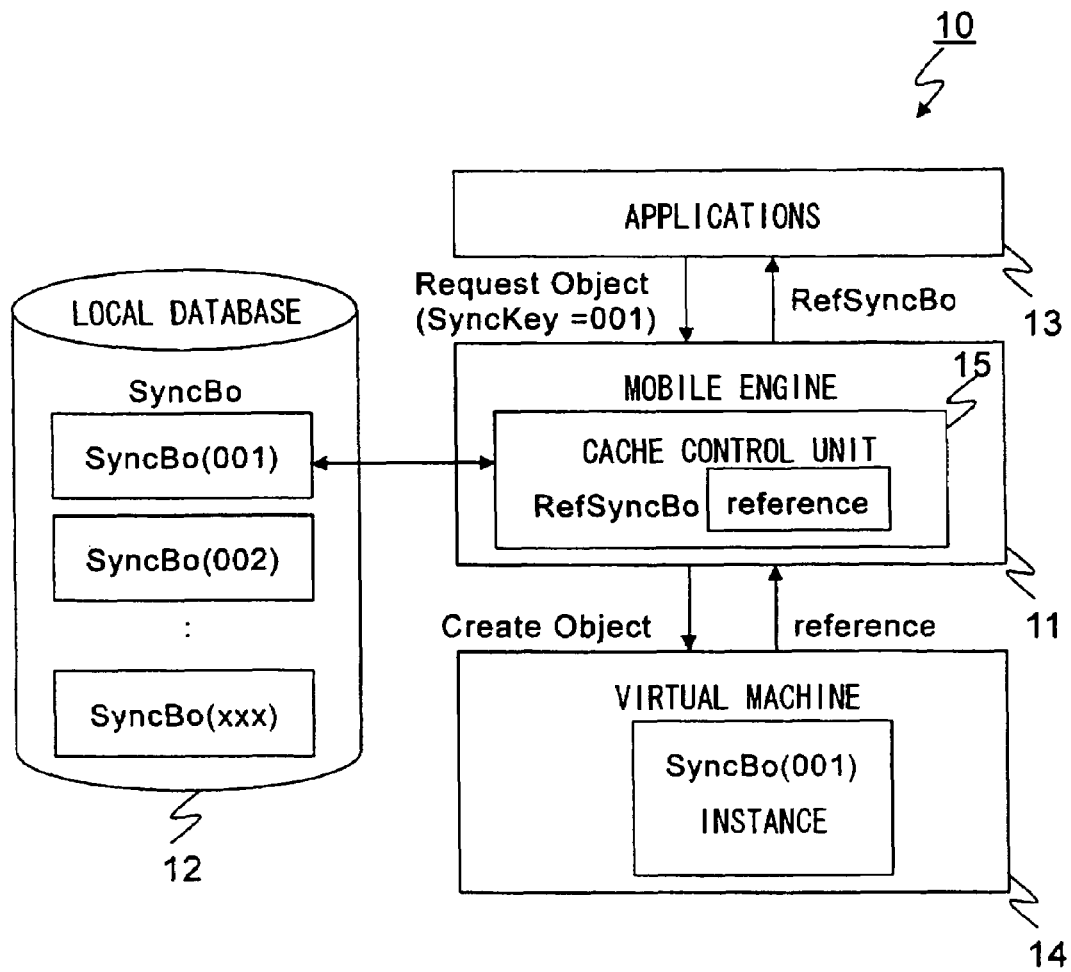

CACHE CONTROL DEVICE, AND METHOD AND COMPUTER PROGRAM FOR THE SAME

CROSS REFERENCE TO RELATED APPLICATION

Priority is claimed on Japanese Patent Application No. 2003-431473, filed on Dec. 25, 2003, the content of which is incorporated herein by reference.

FIELD OF THE INVENTION

The present invention relates to a cache control device, and method and computer program for the same.

DESCRIPTION OF RELATED ART

FIG. 5 shows a block diagram of an existing mobile terminal, which is a client in a conventional client server system. This existing mobile terminal consists of a virtual machine, a mobile engine, and a local database that stores applications and objects (SyncBo) that execute various types of business scenarios.

The virtual machine is an environment for executing applications without dependence on platforms such as the plurality of particular OSs (operating systems) and hardware or the like. The virtual machine is provided with a garbage collector that automatically releases from memory objects that have become unnecessary.

The mobile engine provides an API (Application Program Interface) that conceals the interface for carrying out reading and writing of data for an application. In addition, when the application requests data, the object (SyncBo) that indicates the data definition for the requested data is read from the local database, and an instance of the read object is created in the virtual machine. In addition, a reference that refers to the instance of the created object is returned to the application.

Patent citation 1 (Japanese Unexamined Patent Application, First Publication, No. Hei 6-96025) discloses a system that controls the data memory in the following manner. A first program is a type of data processing system that interacts with a second lower level language program. The second program includes a device for generating objects, a memory that stores these objects, and a device that associates at least one slot allotted to the first program with this object. In addition, at the interface between the first and second programs, an object agent is created that stores the object reference of the object created by the second program. The first program stores the agent reference that identifies this object agent in a slot. Thereby, the collector of information that is unnecessary for the higher level language of the first program notifies the second program when the object agent is not associated with any of the slots by any of the agent references.

In addition, patent citation 2 (Japanese Unexamined Patent Application, First Publication, No. Hei 7-168744) discloses a technology in which the garbage collection function of a conventional object processing system discovers garbage, decreases the burden on the device and system by carrying out release and deletion, and restrains an increase in unnecessary objects. Concretely, in the case that the object (data) is registered in a secondary memory device, the effective period of the object is set in advance. In addition, the object identifier that specifies this object and the effective period thereof are added to and stored in an effective period table. When garbage processing of the objects is carried out, based on the content that has been stored in this effective period table, the objects having an effective period that has expired are deleted from the secondary memory device.

In a mobile terminal (client) in a conventional client server system, there are cases in which identical or different applications request identical data a number of times. At this time, objects for the data requested from the local database are read each time the mobile engine receives a request, and an instance of the object is created. Thus, there is the problem that a plurality of instances is created for the same object. In addition, thereby, even in the case that the same data is referenced, there is the problem that a different instance is referenced, and thus inconsistency in the data occurs. Furthermore, each time the mobile engine receives a request, the object for the data requested from the local database is read, and an instance of the object is created. Thereby, the performance deteriorates. Thus, a cache in which the instance of the created object is held once without being released can be considered. However, the instance of the object created in the virtual machine due to caching exists in the memory space, and thus if the instance is not released when there is no need to reference it, memory is overloaded in particular in a mobile device that has a limited capacity. The release of this instance of an object that has become unnecessary is carried out by the garbage collector provided in the virtual machine. However, the mobile engine cannot grasp whether or not the application is using an object, and cannot know the timing for the release of the instance of the object.

However, in patent citation 1, in the first program that requests the object, the object agent that has become unnecessary is detected, and thereby in the second program the object referenced by this object agent is released and then the object agent itself is processed. However, it is extremely difficult to add similar functions to all preexisting applications. In addition, it is not possible to solve inconsistencies in data due to the generation of a plurality of instances for the same object.

In addition, in patent citation 2, it is difficult for the application to know the interval during which the application will request the object, and therefore, determining a suitable effective period for the object is difficult while taking into account the performance and memory space. In addition, it is not possible to resolve the inconsistencies in data due to generating a plurality of instances for the same object.

SUMMARY OF THE INVENTION

In consideration of the problems described above, it is an object of the present invention to provide a cache control device, and a method and computer program therefore that maintains data consistency and saves memory area, while increasing the speed of the data access from the applications.

In order to obtain the objects described above, the present invention is a cache control device that controls the cache of instances that are referred to by an application, comprising: an instance request reception device that receives access requests for an instance of an object or a class from an application; an instance creating device that creates an instance of the object or the class in the case that the instance of the requested object or class does not exist; a counter creating device that creates a counter that is associated with the instance of the object or the class when the instance creating device creates the instance of the object or the class; a reference setting device that creates an instance of a reference setting class, sets the reference that refers to the instance of the requested object or class and sends the result to the application, and increments by 1 the counter associated with the instance of the object or the class; and an instance release device that receives a release notification for an instance of the reference setting class, decrements by 1 the counter associated with the instance of the object or the class referred to by the instance of the reference setting class, and in the case that the counter has reached 0, releases the instance of the object or the class that is associated with the counter.

In addition, the present invention is a cache control method that can be used in a cache control device that controls the cache of an instance referred to by an application, and consists of the steps of: receiving an access request for an instance of an object or a class from an application; creating an instance of the object or the class in the case that the instance of the requested object or class does not exist; creating a counter associated with the instance of the object or the class when the instance of the object or the class is created; creating an instance of a reference setting class, setting the reference that refers to the instance of the requested object or class and returning the result to the application, and incrementing by 1 the counter associated with the instance of the object or the class; and receiving a release notification for an instance of a reference setting class, decrementing by 1 the counter associated with the instance of the object or the class referred to by the instance of the reference setting class, and releasing the instance of the object or the class that is associated with the counter in the case that the counter has reached 0.

In addition, the present invention provides a computer program that executes the cache control method described above.

According to the present invention, the cache control device increases the speed of the access to data by an application by maintaining an instance of the data in the memory when the application uses the data. In addition, when the data is no longer used, the consistency of the data is guaranteed even in the case that the application requests the same data many times while at the same time memory area is saved by deleting the instances of the data from the memory.

BRIEF DESCRIPTION OF THE DRAWINGS

FIG. 1 is a block diagram of a mobile terminal that is a client in a client server system according to an embodiment of the present invention.

FIG. 2 is a drawing showing the relationships between the sets of data that the mobile engine maintains according to the same embodiment.

DETAILED DESCRIPTION OF THE INVENTION

Figure 3:
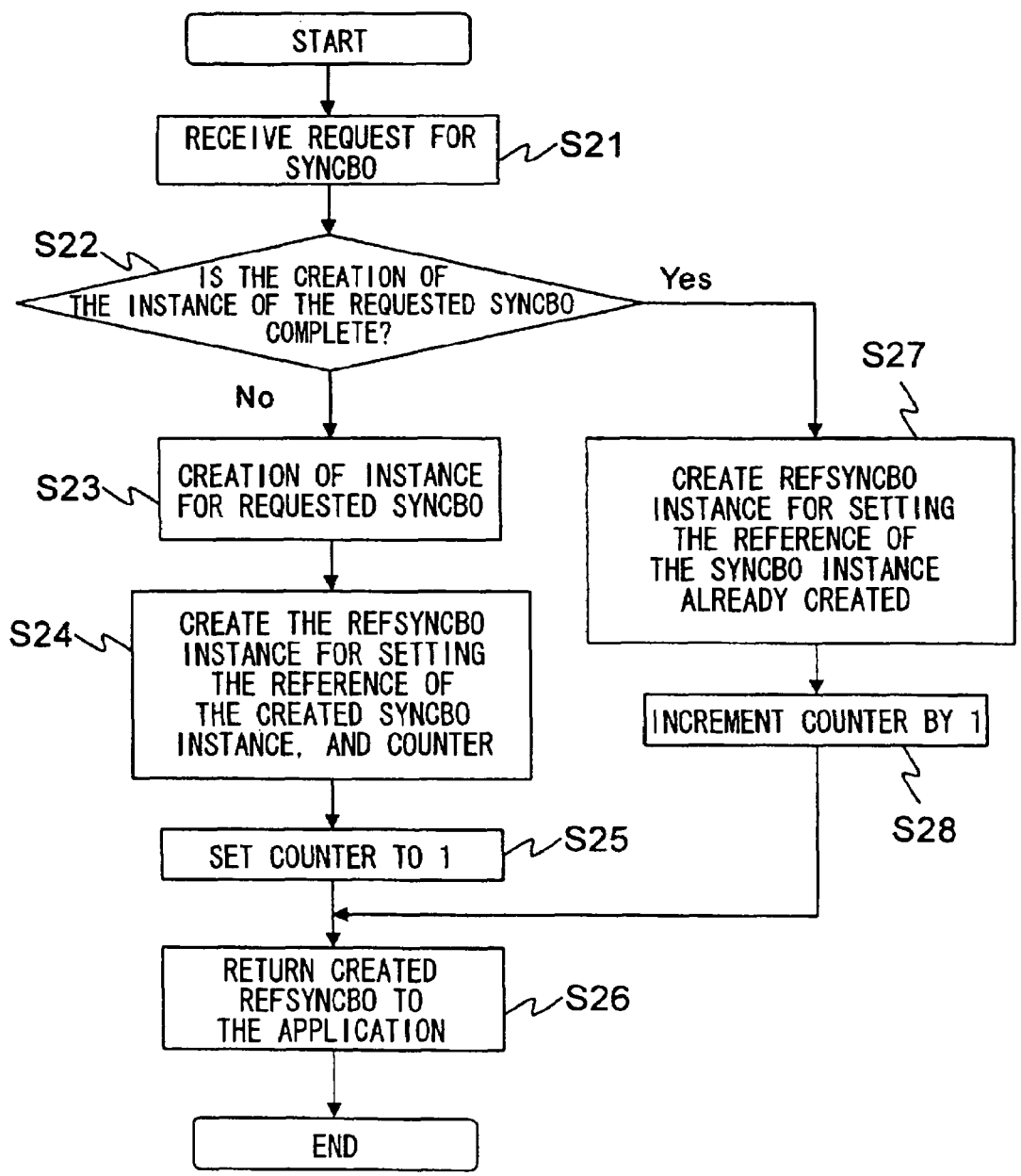
FIG. 3 shows the operation flow of the mobile engine during data access request reception from an application according to the same embodiment.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

Below, the embodiments of the present invention will be explained with reference to the figures. FIG. 1 is a block diagram showing the structure of the mobile terminal 10 that serves as a cache control device, which is a client in the client server system, and only the function blocks related to the present invention are extracted and shown. This mobile terminal 10 consists of a mobile engine 11, a local database 12, applications 13, and a virtual machine 14.

The applications 13 execute any type of business scenario, such as a service order.

The local database 12 stores objects that indicate the data definitions, such as data field definitions and data values of data, which are used by the applications 13. Here, as an object, a synchronization business object (below referred to as SyncBo), described below, is stored. SyncBo extracts and downloads the necessary minimum instances to the mobile terminal 10 while maintaining the reference relationships/non-reference relationships of the data in the mobile terminal 10 based on the business object instances, which are instances of data maintained on the server side. Thereby, the data on the server side and the data on the mobile terminal 10 side can be synchronized without overloading the memory of the mobile terminal 10. Each SyncBo is identified by the SyncKey, which serves as the identification information for the object.

The virtual machine 14 is an environment for executing the programs (application programs) of the applications 13 without dependence on platforms such as the particular plurality of OSs (operating systems) or hardware. Specifically, even of the platform of the mobile terminal 10 changes, the same application program can be executed by this virtual machine 14. Here, the virtual machine 14 is a Java™ Virtual Machine (JVM) that interprets and executes a program by a Java™ byte code, which is an intermediate code created by the Java™ compiler. In the virtual machine 14, a garbage collector is provided that automatically releases from memory objects that have become unnecessary.

The mobile engine 11 downloads the server side SyncBo and stores it in the local database 12 provided internally. In addition, the mobile engine 11 creates an instance of the SyncBo, which is an instance of an object, and at the same time provides an API (Application Program Interface) that conceals the interface for carrying out the reading and writing of data by accessing the interface of the SyncBo, which is an instance of this created object.

The mobile engine 11 provides a cache control unit (an instance request receiving device, an instance generating device, a counter generating device, a reference setting device, and an instance releasing device) 15 that control the cache of the SyncBo instances. The cache control unit 15 creates an instance of the requested SyncBo in the case that the object requested by the application 13, that is, SyncBo, has not been created in the virtual machine 14, and creates an instance of RefSyncBo (reference setting class) for setting the requested reference that references this created SyncBo instance, and returns it to the application 13. In addition, in the case that the instance of the requested SyncBo has already been created in the virtual machine 14, only an instance of RefSyncBo is created without generating a new instance of the relevant SyncBo, and the reference that refers to the already created SyncBo instance is set and returned. In addition, the cache control unit 15 maintains a counter that indicates the number of the RefSyncBos that have been created for an instance of the same SyncBo. That is, the cache control unit 15 increments by 1 the counter when an instance of RefSyncBo is created, and when the garbage collector of the virtual machine 14 releases the instance of RefSyncBo that is not longer used in the application 13, the counter is decremented by 1. In addition, when the counter reaches 0, the SyncBo instance associated with this counter is released.

FIG. 2 shows an example of the relationship between the SyncBo, the reference of the created SyncBo instance, and the counter. In the figure, the mobile engine 11 associates and stores [SyncKey=001], which identifies an instance of the already created SyncBo, [bo], which is the reference of the SyncBo instance that has been identified by [SyncKey=001], and the counter value "1", which indicates the number of the created RefSyncBo instances associated with the SyncBo identified by [SyncKey=001].

Next, the operation of the mobile terminal 10 will be explained. FIG. 3 shows the operation flow of the cache control unit 15 during the reception of a data access request from the application 13.

When the mobile engine 11 receives SyncKey from the application 13, and then receives the access request for new data, that is, for a new instance of SyncBo, this is delivered to the cache control unit 15 (step S 21). Thereby, the cache control unit 15 refers to the SyncKey of the stored internally SyncBo whose generation has been completed, and determines whether or not the generation of the instance of the requested SyncBo has already been completed depending on whether or not there is a SyncKey that matches the received SyncKey (step S 22).

In the case that the cache control unit 15 determines that the instance of requested SyncBo has not been created, the SyncBo identified by the received SyncKey is read from the local database 12, and an instance of SyncBo read from within the virtual machine 14, that is, a SyncBo instance, is created (step S 23). For example, when the SyncBo (001) identified by [SyncKey=001] is requested by the application 13, an instance of SyncBo (001) referred to by the reference called [bo] is created in the virtual machine 14.

Next, the cache control unit 15 creates an instance of RefSyncBo for setting the reference of the created SyncBo instance and a counter that indicates the number of RefSyncBo instances that have been created for the SyncBo instance (step S 24). In addition, this created counter is set to 1 (step S 25). Thereby, as shown in FIG. 2, the cache control unit 15 associates and stores a SyncKey, a reference for the SyncBo instance, and a counter value that indicates the number of RefSyncBo instances that have been created.

In addition, the mobile engine 11 sets the reference, specifically, [bo], of the SyncBo instance created in the RefSyncBo instance, and returns this to the application 13 (step S 26). The application 13 uses the received RefSyncBo instance internally, and carries out copying and the like.

When the mobile engine 11 again receives the request for SyncBo (001), which has been identified by [SyncKey=001], from the application 13, it is delivered to the cache control unit 15. The cache control unit 15 refers to the SyncKey of the SyncBo whose instance is already created and stored therein, and determines that an instance of the requested SyncBo (001) has already been generation because a SyncKey that matches the received SyncKey exists (step S 22;YES). In this case, the cache control unit 15 does not create an instance of SyncBo (001), and only a new RefSyncBo instance is created (step S 27). Then, 1 is added to the current counter of the counter associated with the instance of SyncBo (001) (step S 28). Subsequently, the cache control unit 15 sets [bo], which is the reference of the instance of SyncBo (001), to the newly created RefSyncBo, and returns this to the application 13 (step S 26).

Figure 4:
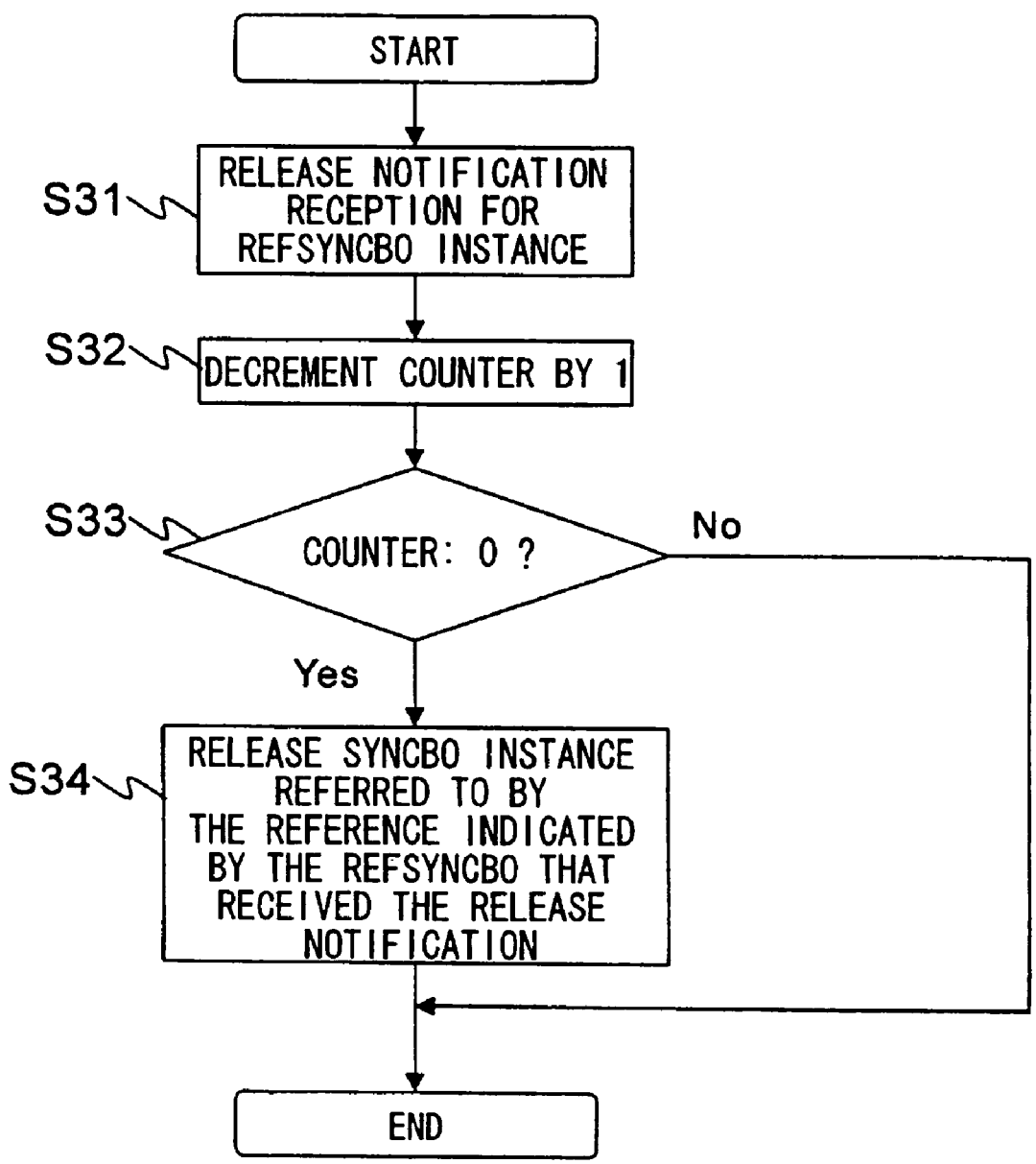
FIG. 4 shows the operation flow of the mobile engine while the RefSyncBo instance is deleted according to the same embodiment.
Figure 5:
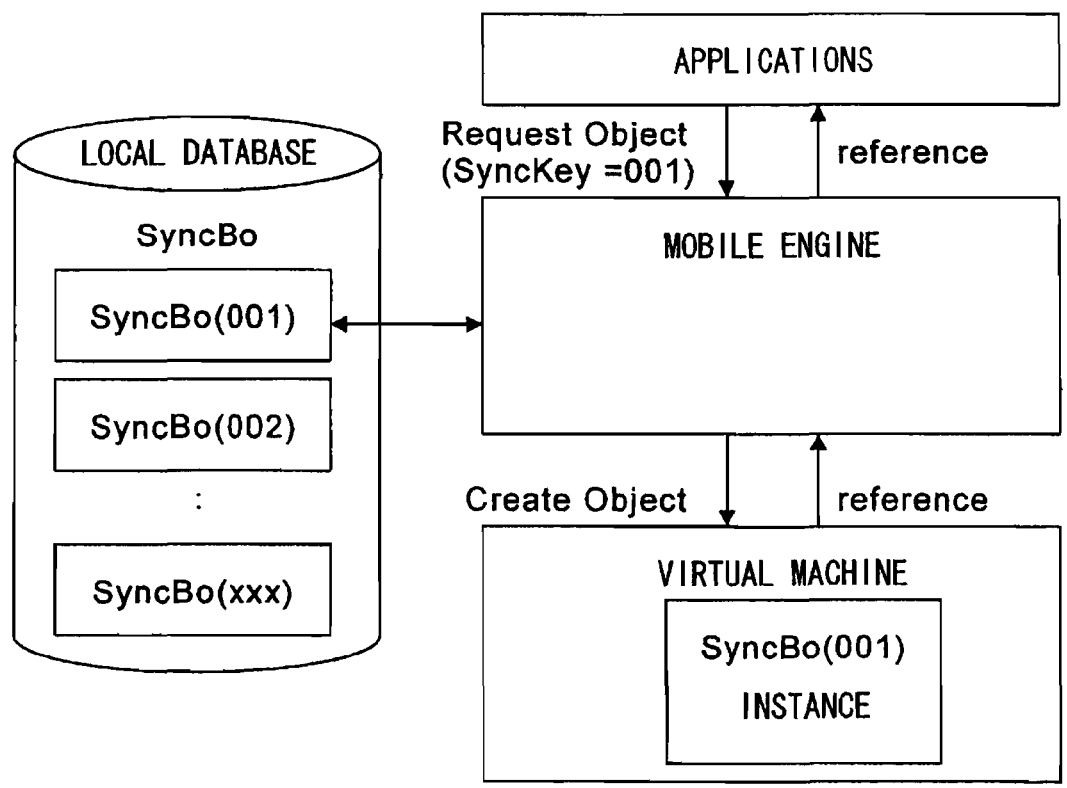
FIG. 5 is a block diagram of a mobile terminal, which is a client in a conventional client server system.

FIG. 4 shows the operation flow of the cache control unit 15 during the deletion of the RefSyncBo instance.

First, the garbage collector detects and releases RefSyncBo instances that are not being used by the application 13. Normally, in all classes (objects), a method for the release of instances is included in advance, and thereby the RefSyncBo instance notifies the cache control unit 15 that it will be released immediately. When the cache control unit 15 receives the release notification of the RefSyncBo instance (step S 31), the counter value of the counter associated with this released RefSyncBo instance is decremented by 1 (step S 32). Then, it is determined whether or not the counter value has reached 0 (step S 33) as a result of this decrementing. In the case that the counter value has not reached 0, the subsequent processing is not carried out, and the cache control unit 15 waits for notification of an access request for SyncBo or the release of the RefSyncBo instance.

In contrast, in step S 33, in the case that it is determined that the counter value has reached 0, the cache control unit 15 releases the SyncBo instance referenced by the reference that is indicated by this released RefSyncBo instance (step S 34).

Note that in the embodiment described above, the data requested by the application 13 is defined by the object (SyncBo), but this may also be defined by a class definition.

According to the embodiment described above, the mobile terminal 10 makes access to data by an application 13 more rapid by maintaining in memory an instance of the data when the application 13 uses the data. In addition, in the case that the data is not being used, the consistency of data is guaranteed even in the case that the application 13 has requested the same data a number of times, while memory space is saved by deleting the instance of the data from the memory.

Note that the mobile terminal 10 has an internal computer system. In addition, the steps of the operation of the mobile terminal 10 described above are stored on a computer readable recording medium in the form of a program, and the processing described above is carried out by this program being read and executed by a computer system. Here, a computer system includes an OS and hardware such as peripherals.

In addition, the expression "computer readable recording medium" denotes, in addition to ROM, a portable medium such as a magnetic disk, a magneto-optical disk, a CD-ROM, and a memory device such as a hard disk built into a computer system. Furthermore, the expression "computer readable recording medium" also includes a system that transmits a program via a communication line such as a network, for example, the Internet, or a telephone line, and a medium that temporarily stores a program, such as the volatile memory (RAM) in a computer system that serves as a client.

In addition, the program described above can be transmitted from a computer system that stores this program in a memory device or the like to another computer system via a transmission medium or by carrier waves in a transmission medium. Here, a "transmission medium" that transmits the program denotes a medium having the capacity to transmit information, such as a communication line such as a network, for example, the Internet, or a communication line such as a telephone line.

In addition, the program described above can be a program for realizing a portion of the capacity described above. Furthermore, the program can be what is termed a distributed file (distributed program), which can realize the functions described above in combination with a program already recorded on a computer system.

Figure 6:
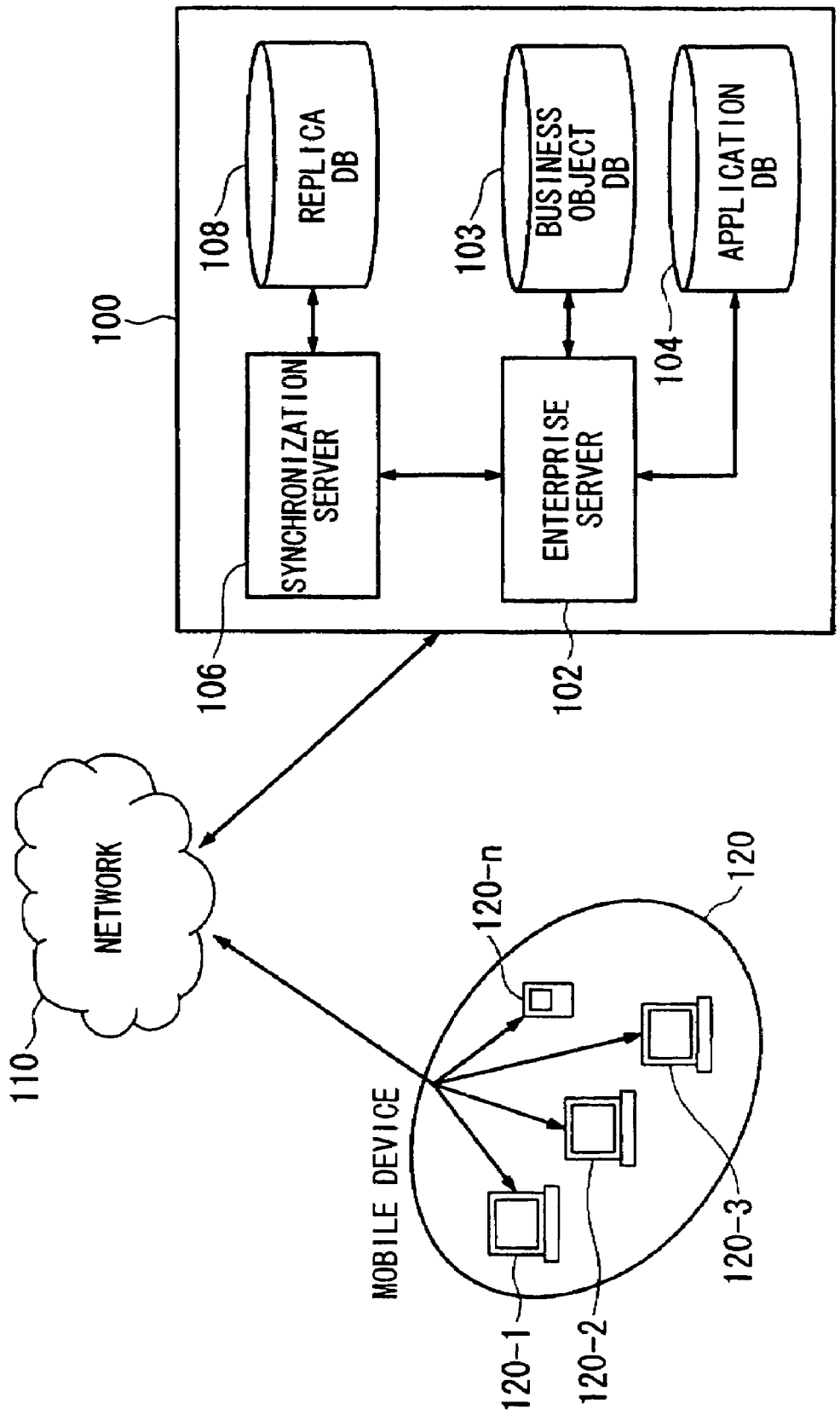
FIG. 6 is a structural diagram of the client server system that can use the mobile terminal according to the embodiment shown in FIG. 1 as a client.

Below, a client server system in which the mobile terminal 10 serving as the cache control device described above can be used as a client will be explained. FIG. 6 is a structural diagram showing the structure of a client server system in which the mobile terminal 10 described above can be used as a client. An enterprise server system 100 is structured by being connected to a plurality of mobile devices (mobile terminals) 120 via a network 110.

Concretely, the enterprise server system 100 is formed from an enterprise server 102 and a synchronization server 106.

The enterprise server 102 consists of a business object database (below, database is abbreviated DB) and an application DB 104, and data communication management between the mobile device 120, the business object DB 103, and an application DB 104 is carried out via a synchronization server 106.

Figure 7:
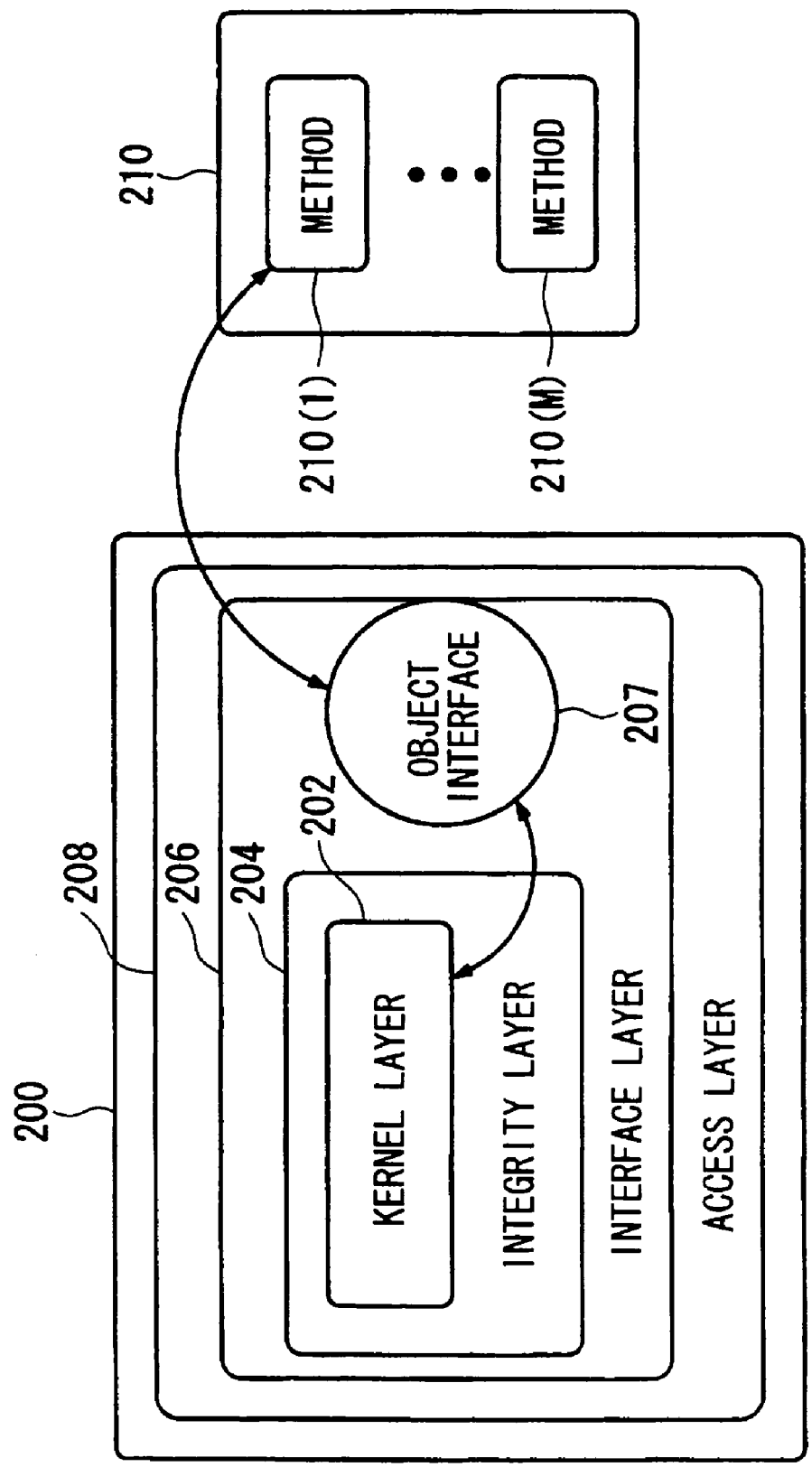
FIG. 7 is a structural diagram of the function layer of the business object in the client server system shown in FIG. 6.

As shown in FIG. 7, the business object DB 103 stores a plurality of business objects 200. Here, a business object 200 is defined by capsulating properties associated with the enterprise server 102 and the business methods 210, and consists of a kernel layer 202, an integrity layer 204, an interface layer 206, and an access layer 208.

The kernel layer 202 forms data (properties) associated with the business objects 200 (described below). The integrity layer 204 carries out data consistency checks based on the constraints of the environmental variables. The interface layer 206 defines a plurality of methods and interfaces associated with the business object 200, and includes the object interface 207. The access layer 208 defines a module for accessing the business objects 200.

The application DB 104 stores applications that the enterprise server 102 provides to the mobile device 102.

The synchronization server 106 has a replica DB 108, and carries out data synchronization control between the mobile device 120, the business object DB 103, and the application DB 104. Concretely, the synchronization server 106 determines the data to be uploaded or downloaded between the business object DB 103 and the application DB 104 based on predetermined selection conditions (filtering criteria), and at the same time, carries out data operations such as production, correction, deletion based on reference relations, non-reference relations (dependence relationships between data), cascade download flags and the like for data that satisfies the selection conditions.

The replica DB 108 stores replica data, in which the business objects that are stored in the business object DB 103 serve as the master data.

Figure 8:
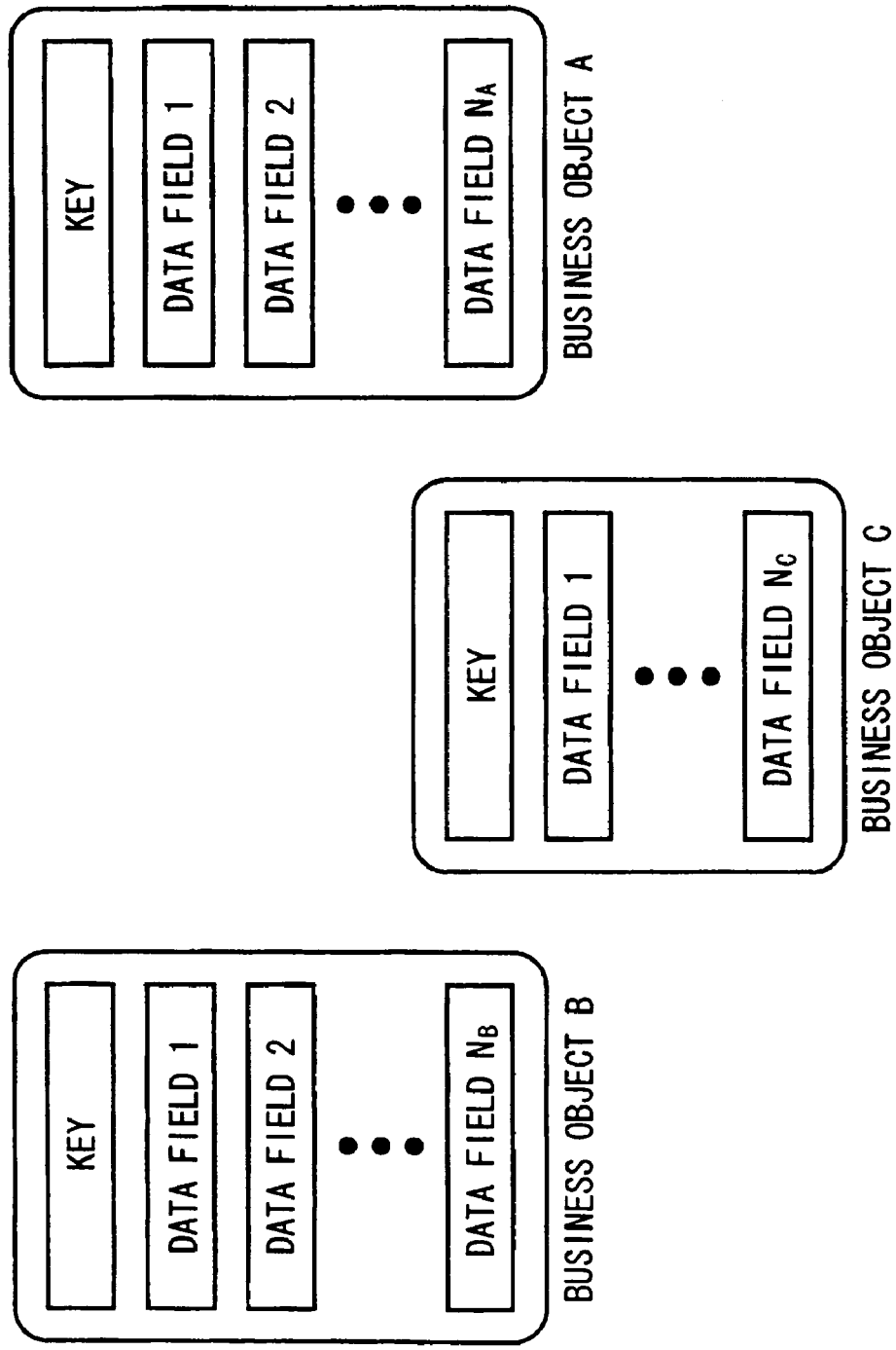
FIG. 8 is a data structure diagram of the business object in the client server system shown in FIG. 6.

Concretely, as shown in FIG. 8, the business objects (A to C) stored in the business object DB 103 is formed by one key and a plurality of data fields, and, as described above, has a data field portion that is redundant to the user of the mobile terminal. Therefore, when these redundant data fields as a whole are all transmitted to the mobile terminal, the memory capacity of the mobile terminal is overloaded, and thus optimization of the transmitted data is necessary.

Figure 9:
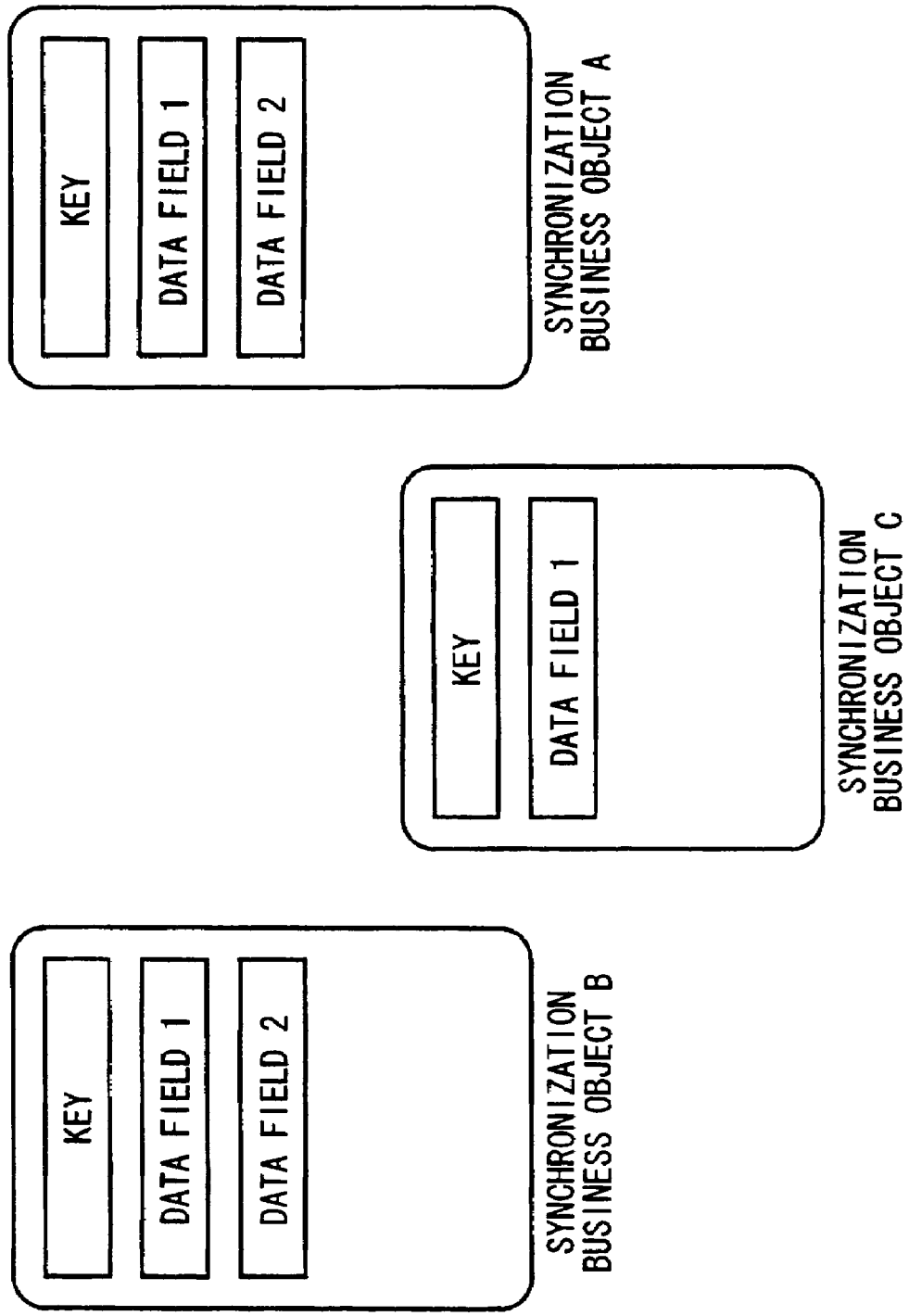
FIG. 9 is a data structure diagram of the SyncBo in the client server system shown in FIG. 6.
Figure 10:
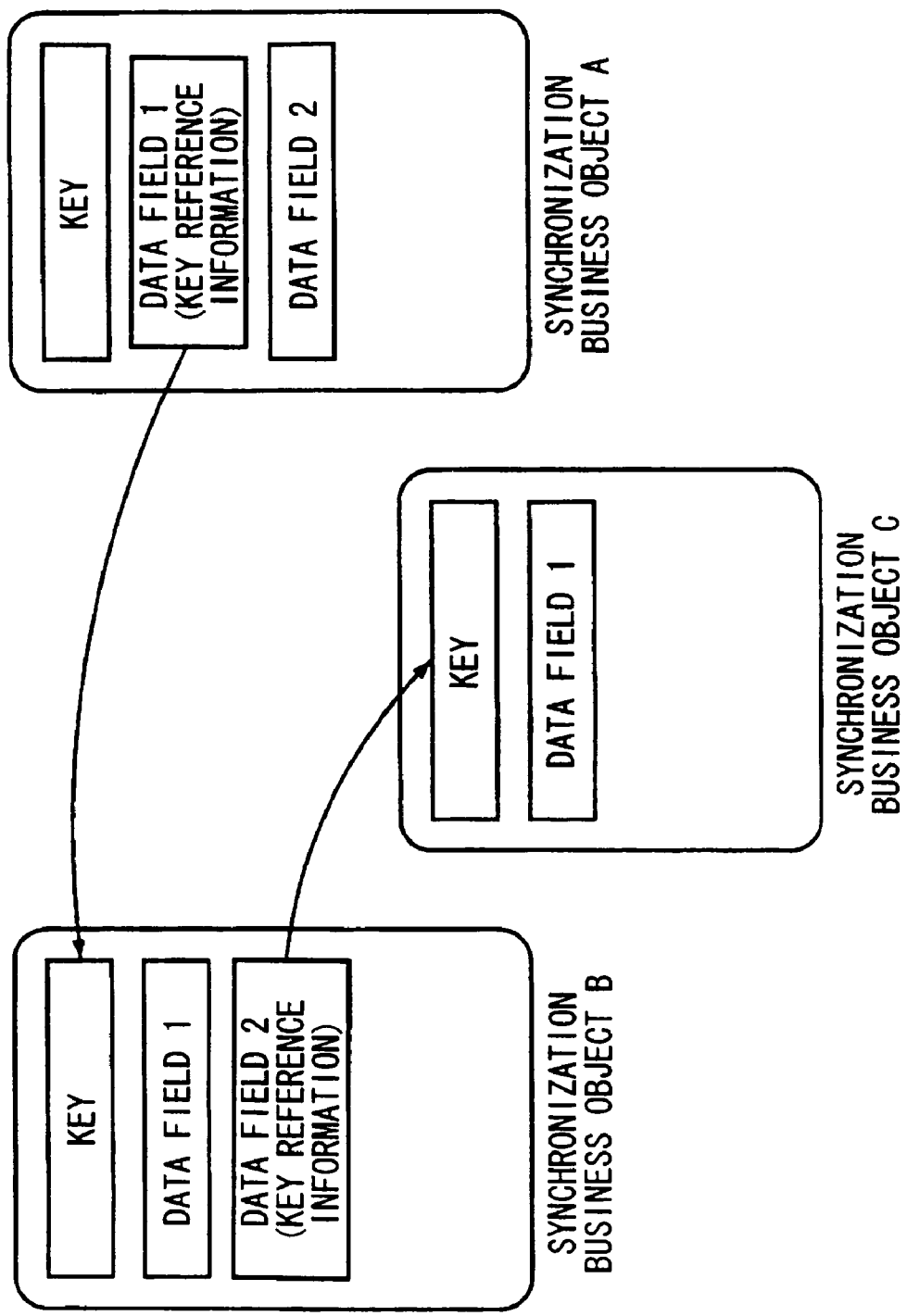
FIG. 10 is a data structure and reference relationship diagram of the SyncBo in the client server system shown in FIG. 6.

Thus, as shown in FIG. 9 and FIG. 10, the replica DB 108 extracts only necessary data fields from each of the business objects that satisfy the selection conditions based on the data synchronization control of the synchronization server 106, and stores the synchronization business objects A to C (below, called SyncBo) in which replacement of data fields has taken place between business objects having reference relationships.

Figure 11:
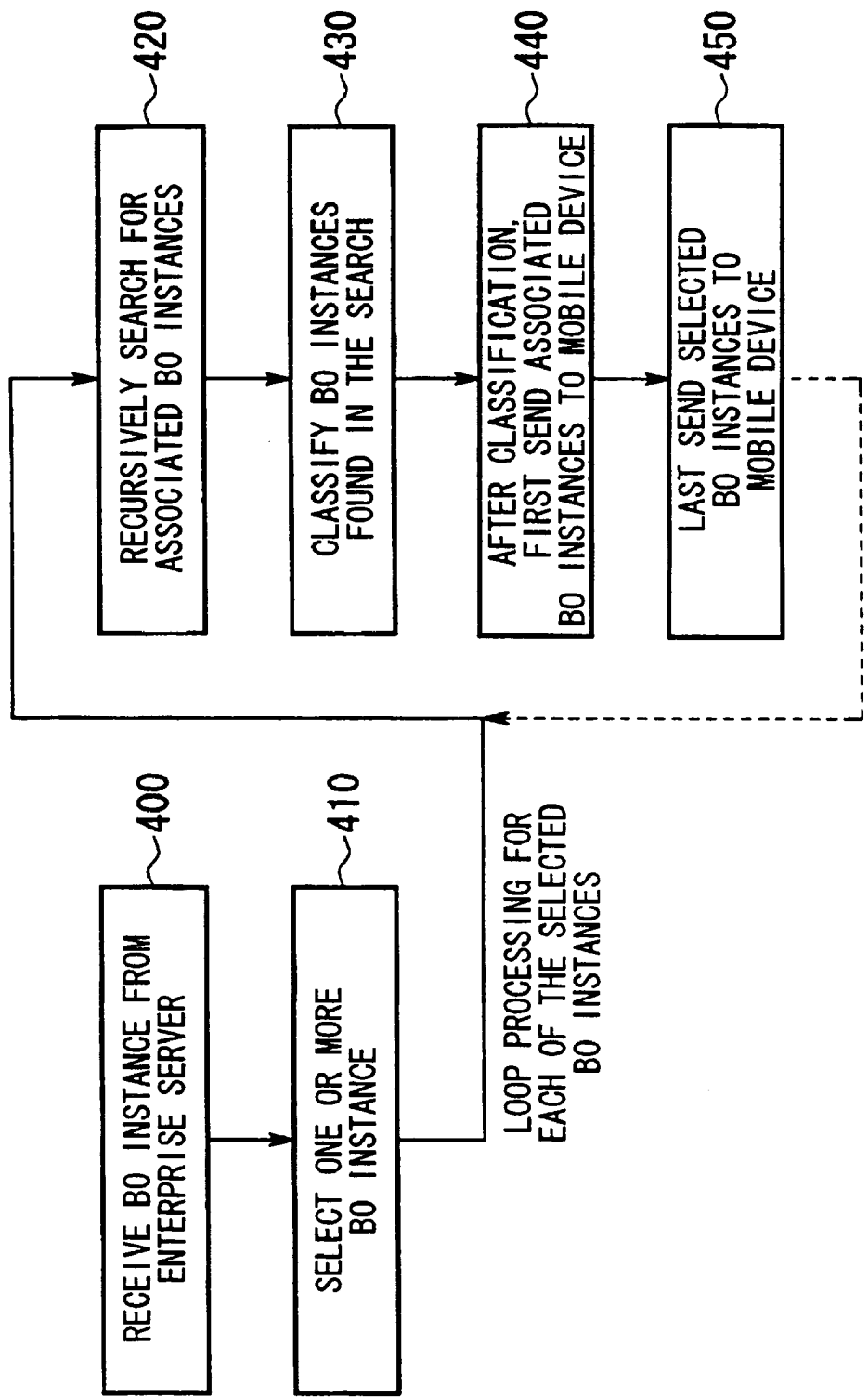
FIG. 11 is a flowchart of the cascade download processing in the client server system shown in FIG. 6.

Next, with reference to the figures, the operation of the synchronization server 106 in FIG. 6 will be explained. FIG. 11 is a flowchart showing the steps of the cascade download processing by the synchronization server 106.

In the synchronization server 106, when, in the enterprise server 102, the data in the business object DB 103 and the business objects 200 stored in the application DB 104 is periodically updated by addition, deletion, correction or the like, this updated data is received by the replica DB 108 as well.

Figure 12:
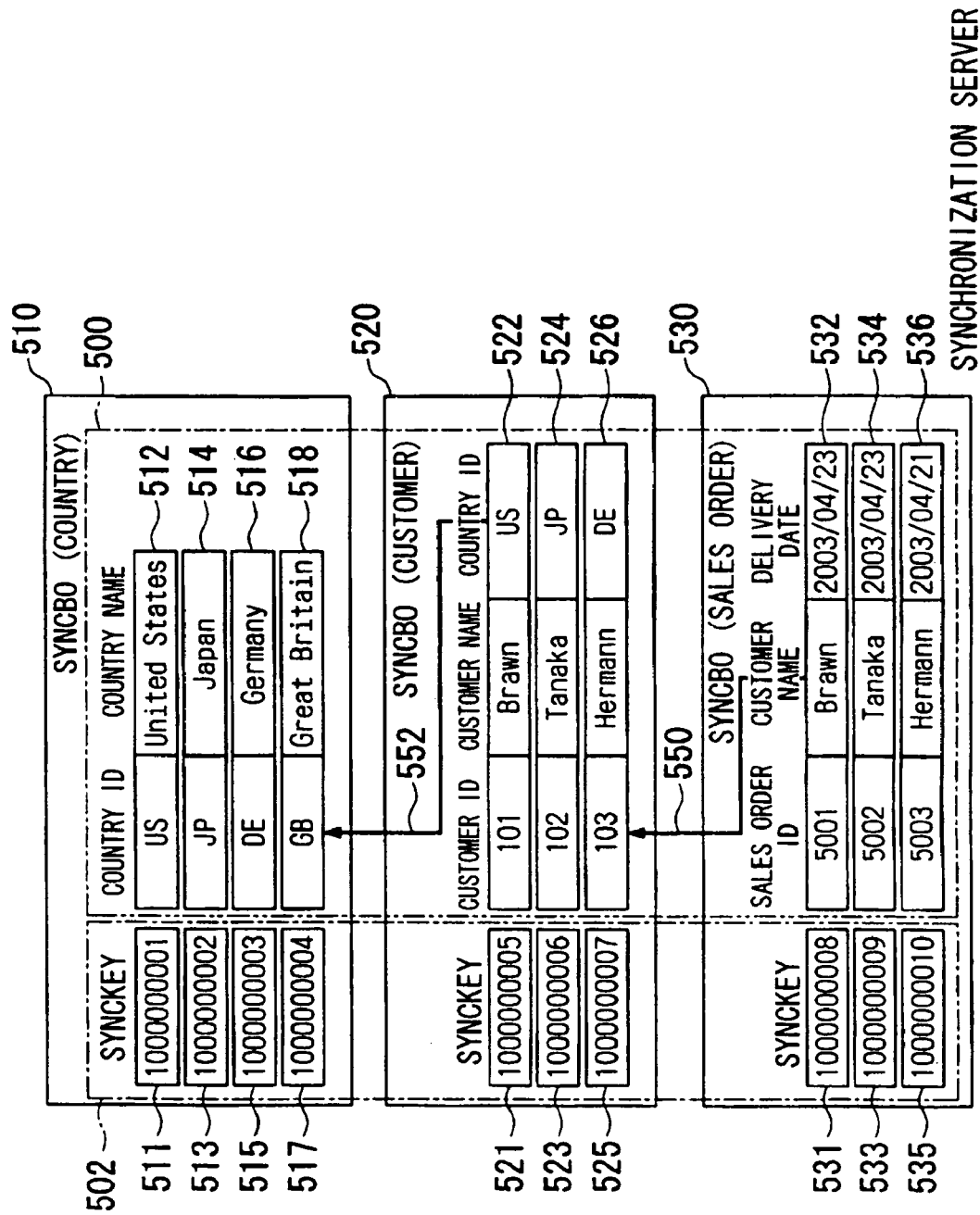
FIG. 12 is a data structure diagram of the replica DB in the client server system shown in FIG. 6.

That is, as shown in FIG. 12, when an instance of a business object 200 having types for "country", "customer", and "sales order" is received from the enterprise server 102 (step 400 in FIG. 6), the synchronization server 106 creates a SyncKey (synchronization key information) to each SyncBo, and in the replica DB 108, these are associated with each of the received instances, and stored.

For example, in the SyncBo 510 (SyncBo ID: 510) whose type is "country", a SyncKey 511 having a value of "1000000001" is created and associated with the business object instance 512, whose country ID is "US" and country name is "United States". Similarly, SyncKeys 513, 515, and 517 are created and associated with the business object instances 514, 516, and 518.

In addition, in the SyncBo 520 (SyncBo ID: 520), whose type is "customer", a SyncKey 521 having a value of "1000000005" is created and associated with a business object instance 522, whose customer ID is "101", customer name is "Brawn", and country ID is "US". Similarly, SyncKeys 523 and 525 are created and associated with the business object instances 524 and 526.

Next, in the SyncBo 530 (SyncBo ID: 530) whose type is "sales order", a SyncKey 531 having a value of "1000000008" is created and associated with a business object instance 532, whose sales order ID is "5001", customer name is "Brown" and delivery date is "2003/04/23". Similarly, SyncKeys 533 and 535 are created and associated with the business object instances 534 and 536.

Here, as shown in FIG. 12, the data element "customer name" in SyncBo 530 has a data reference relationship with the data element "customer ID" in SyncBo 520 (refer to arrow 550), and contrariwise, the data element of SyncBo 520 has a data non-reference relationship with the data element "customer name" of SyncBo 530.

Similarly, the data element "country ID" of the SyncBo 520 has a data reference relationship with the data element "country ID" of the SyncBo 510 (refer to arrow 552), and contrariwise, the data element "customer ID" of the SyncBo 510 has a data non-reference relationship with the data element "country ID" of the SyncBo 520.

In the present specification, the data reference relationship/non-reference relationship (dependent relationship/non-dependent relationship) between SyncBos is defined as a "parent-child relationship".

Next, the synchronization server 106 searches the replica DB 108 based on the preset selection conditions (indicating which SyncBo instance in the replica DB 108 should be downloaded to which mobile device), and one or a plurality of instances to be downloaded are listed and extracted. Below, an instance of the extracted SyncBo is called an instance of a download candidate object.

The synchronization server 106 reads this list of download candidate objects, and examines the data reference relationships/non-reference relationships sequentially and recursively for all of the instances of the download candidate objects.

Here, a recursive examination of download candidate objects denotes the case in which, when the download candidate object that is to be currently examined has data reference relationships/non-reference relationships with other object data (not necessarily download candidate objects), the other object data then serves as the current object of examination, and then the examination of the data reference relationships/non-reference relationships is repeated.

Specifically, the synchronization server 106 first selects the instance of one download candidate object (step S 420), the data reference relationships in the parent direction are examined, and search for instances of relevant object data is carried out (step S 420).

For example, as shown in FIG. 12, the data element "customer ID: 101" of the instance 532 has a reference relationship with the data element "customer ID: 101" of the instance 522, and the data element "country ID: US" of the instance 522 has a reference relationship with the data element "country ID: US" of the instance 512. Thus, the synchronization server 106 first searches the data element "customer ID: 101" of the instance 522, which has a reference relationship with the data element "customer ID: 101" in the case that the instance 532 is selected as the download candidate object. Then, the synchronization server 106 executes recursive search processing after the instance 522 is made the current search object. In this case, the synchronization server 106 further searches the data element "country ID: US" of the instance 512, which has a reference relationship with the data element "country ID: US".

Next, as a result of the search of the reference relationship for the instance 532, the synchronization server 106 arranges the extracted instances 512 and 522 in ascending (or descending) hierarchical levels of reference relationships (step S 430). In the case of a descending arrangement, in the hierarchical levels of the reference relationships, the instances of the candidate download objects are arranged from the instance 512, which is defined as the highest ranking in the parent direction, to the instances 522 and 532 in the child direction. Then the synchronization server 106 sends the instances 512 and 522, which are the cascade download objects, to the mobile device 120 in this order (step S 440). After the sending of these cascade download object instances has completed, the synchronization server 106 then sends the instance 532, which was originally selected as the download candidate object to the mobile device 120 (step S 450).

In this manner, after sending other instances having non-reference relationships, the synchronization server 106 sends instances having reference relationships to the mobile device, and thereby in the memory of the mobile device, the effect is obtained that it is possible to prevent the occurrence of a data error in which reference data does not exist.

Similarly, when the instance 534 is selected (step S 410), as a result of the search, the instances 524 and 514 are extracted (step S 420), they are arranged in descending order (step S 430), and after completion of the sending of the cascade download object instances 524 and 514, which have non-reference relationships (step S 440), the instance 534 is sent and processed as a download candidate object.

Figure 13:
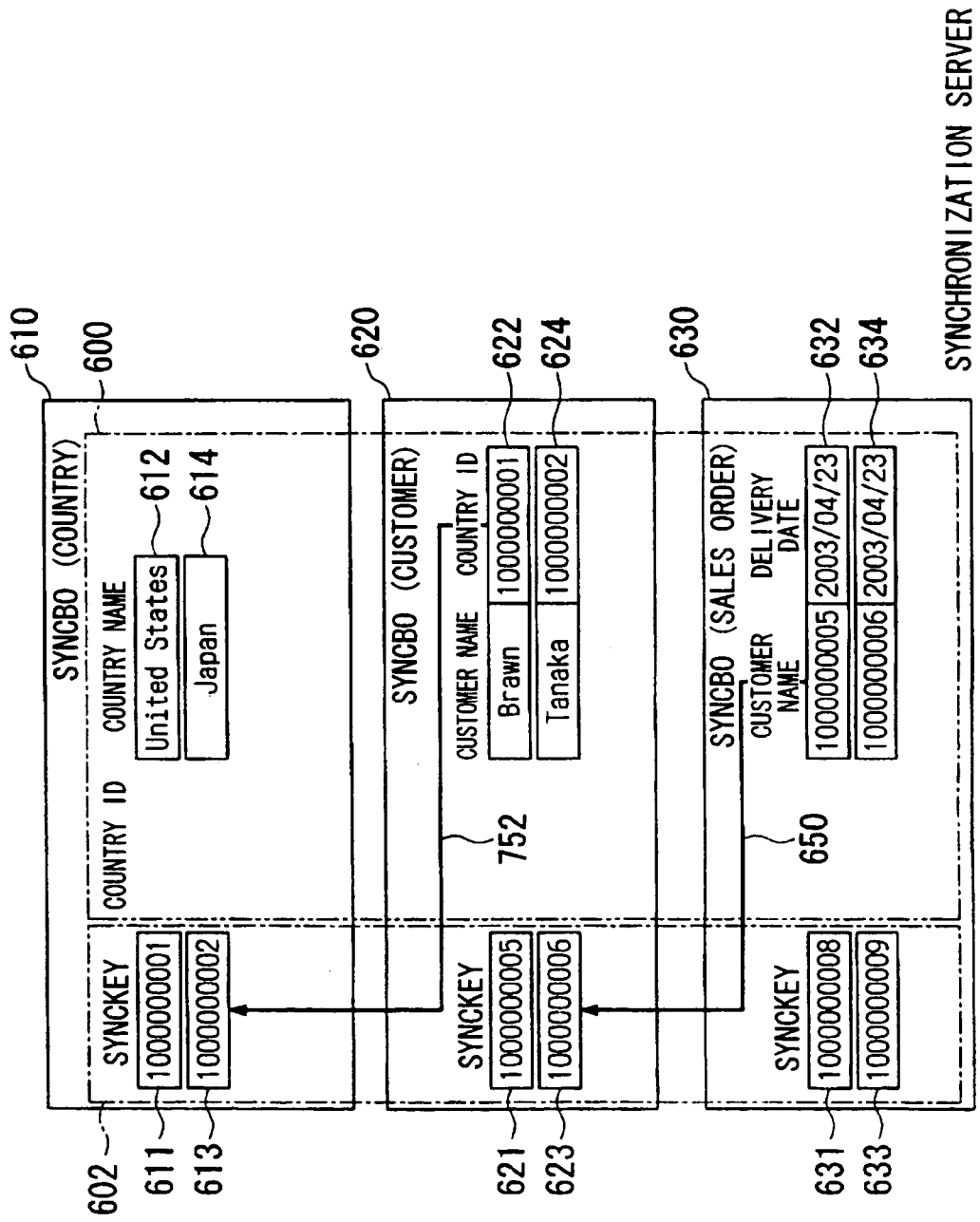
FIG. 13 is a structural diagram of the download data of the mobile device in the client server system shown in FIG. 6.

FIG. 13 shows the object data that is extracted from the replica DB 108 and sent to the mobile device 120.

In the replica DB 108, each of the instances 512, 514, 516, 518, 522, 524, 526, 532, 534, and 536 are identified in a unified manner by using the respective SyncKeys 511, 513, 515, 517, 521, 523, 525, 531, 533, and 535. Thereby, the data element "customer ID" of the instances 532 and 534 are replaced by the SyncKeys 521 and 523 (corresponding to the SyncKeys 621 and 623 shown in FIG. 13). At the same time, the data element "country ID" of instances 522 and 524 is replaced by the SyncKeys 511 and 513 (corresponding to the SyncKeys 611 and 613 shown in FIG. 13).

The enterprise server 102 includes the synchronization server 106 and the mobile device 120 includes a computer system internally.

In addition, the steps of the sequence of processes related to the cascade download processing and the cascade deletion processing described above are stored on a computer readable recording medium in the form of a program, and this processing is carried out by the computer reading and executing this program.

Specifically, in the enterprise server 102, the synchronization server 106, and the mobile device 120, each of the processing steps and processing units are realized by a central arithmetic processing device such as a CPU that reads the program residing on a main memory device such as ROM or RAM, and executes the data processing and arithmetic processing.

Here, a computer readable recording medium denotes a magnetic disk, a magneto-optical disk, CD-ROM, DVD-ROM, semiconductor memory and the like. In addition, this computer program can be delivered to a computer by a communication line and the computer that has received this delivery can execute this program.

What is claimed is:

1. A cache control unit comprising an internal computing system that comprises executable program instructions and a processor for executing the program instructions, wherein the cache control unit controls the cache of instances of database objects that are referred to by an application, the cache control unit comprising the following components implemented in the internal computing system:

an instance request reception device that receives access requests for an instance of an object or a class from an application;

an instance creating device that creates, in a virtual machine that is separate from the cache control unit, an instance of the object or the class in the case that the instance of the requested object or class does not exist;

a counter creating device that creates a counter that is associated with the instance of the object or the class when the instance creating device creates the instance of the object or the class;

a reference setting device that creates, in the virtual machine, an instance of a reference setting class, sets the reference that refers to the instance of the requested object or class and sends the result to the application, and increments by 1 the counter associated with the instance of the object or the class; and an instance release device that receives a release notification for an instance of the reference setting class, decrements by 1 the counter associated with the instance of the object or the class referred to by the instance of the reference setting class, and in the case that the counter has reached 0, releases the instance of the object or the class that is associated with the counter.

2. A cache control method used in a cache control unit comprising a computing system that comprises executable program instructions and a processor for executing the program instructions, wherein the cache control unit controls the cache of an instance referred to by an application, wherein the cache control method comprises:

receiving an access request for an instance of an object or a class from an application;

creating, in a virtual machine that is separate from the cache control unit, an instance of the object or the class in the case that the instance of the requested object or class does not exist;

creating a counter associated with the instance of the object or the class when the instance of the object or the class is created;

creating, in the virtual machine, an instance of a reference setting class, setting the reference that refers to the instance of the requested object or class and returning the result to the application, and incrementing by 1 the counter associated with the instance of the object or the class; and receiving a release notification for an instance of a reference setting class, decrementing by 1 the counter associated with the instance of the object or the class referred to by the instance of the reference setting class, and releasing the instance of the object or the class that is associated with the counter in the case that the counter has reached 0.

3. A computer program stored on a computer readable medium and used in a cache control unit comprising a computing system that comprises executable program instructions stored on the computer readable medium and a processor for executing the program instructions, wherein the cache control unit controls the cache of an instance referred to by an application, wherein when the computer program is executed by the processor a method is performed that comprises:

a step of receiving an access request for an instance of an object or a class from an application;

a step of creating, in a virtual machine that is separate from the cache control unit, an instance of the object or the class in the case that the instance of the requested object or class does not exist;

a step of creating a counter associated with the instance of the object or the class when the instance of the object or the class is created;

a step of creating, in the virtual machine, an instance of a reference setting class, setting the reference that refers to the instance of the requested object or class and returning the result to the application, and incrementing by 1 the counter associated with the instance of the object or the class; and a step of receiving a release notification for an instance of an reference setting class, decrementing by 1 the counter associated with the instance of the object or the class referred to by the instance of the reference setting class, and releasing the instance of the object or the class that is associated with the counter, in the case that the counter has reached 0.

4. The method of claim 2, wherein the instance of the reference setting class, after being created in the virtual machine, is passed to the application from which the access request was received.

5. The method of claim 4, wherein the release notification is received in the cache control unit from the application from which the access request was received.

6. The method of claim 2, wherein the cache control unit resides in a mobile engine.

7. The method of claim 6, wherein the mobile engine resides in a mobile terminal.

8. The method of claim 2, wherein the cache control unit resides in a mobile terminal.

9. The method of claim 8, wherein the object or class for which the instance is created in the virtual machine is an object or class that has a corresponding object or class in a server-accessible database.

10. The method of claim 9, wherein the object or class for which the instance is created in the virtual machine is stored in a local database that resides in the mobile terminal.

11. The method of claim 8, wherein the virtual machine resides in the mobile terminal.

\* \* \* \* \*